Figure 1:
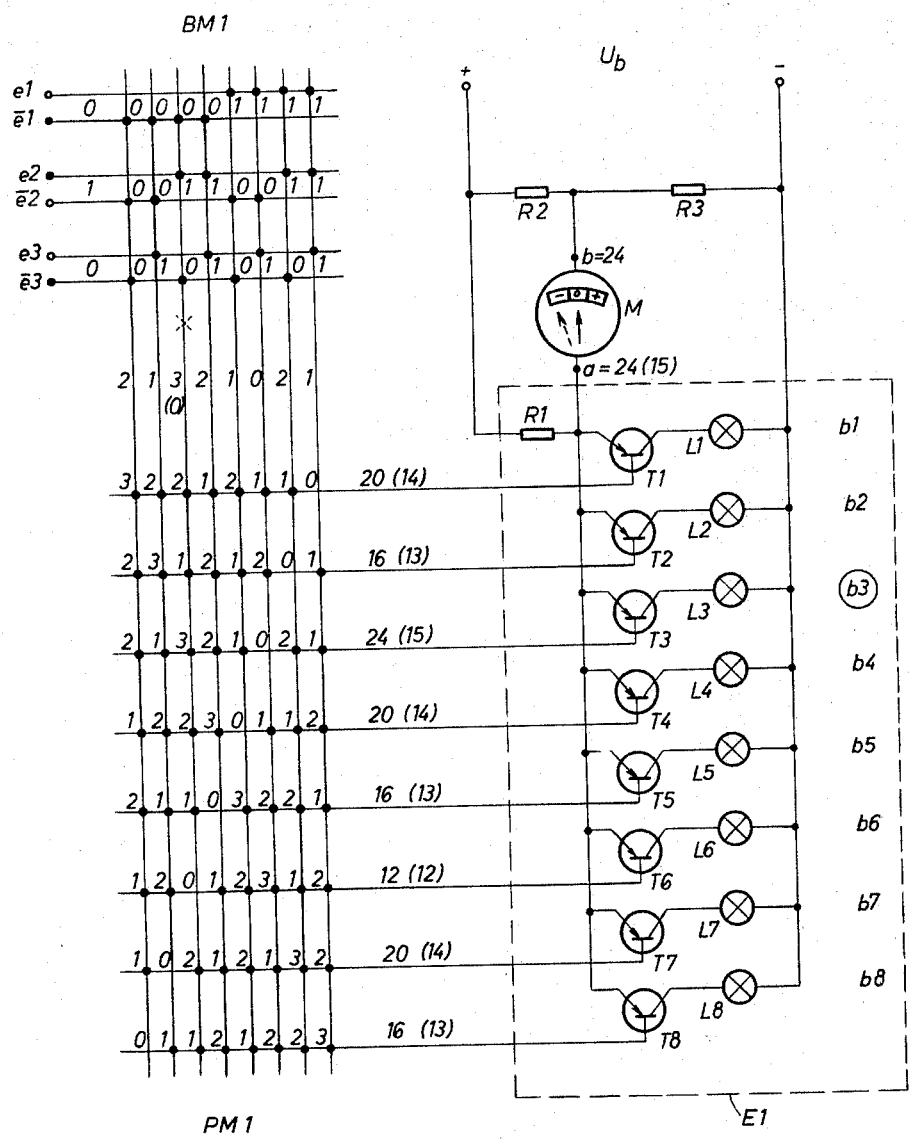

United States Patent Office 3,395,389
Patented July 30, 1968

3,395,389
APPARATUS TO INDICATE FAULTS OF COMPONENTS IN SELF-CORRECTING TRANSLATORS
Farhang Zendeh Zartoshti, Kornwestheim, Wurttemberg, Germany, assignor to International Standard Electric Corporation, New York, N.Y., a corporation of Delaware
Filed Aug. 6, 1963, Ser. No. 300,308
Claims priority, application Germany, Dec. 18, 1962, St 20,093
1 Claim. (Cl. 340—146.1)

The invention relates to a method and an arrangement to indicate the faults of components in self-correcting translators, said translators consisting of a testing matrix and a meaning matrix with linear conductances at the cross-points. If the translator is a decoder the characters to be decoded are fed into the input lines of a meaning matrix and reach from the matrix's outputs the inputs of a testing matrix and from the latter's outputs the inputs of an extreme or crest value circuit. From the outputs of this extreme value circuit may be gathered the meaning aligned to the different input characters.

If a translator is a coder the voltager representing individual meanings are led to the input of a testing matrix from the outputs of which they are led to the inputs of a meaning matrix and from its outputs in complementary pairs to the inputs of several extreme value circuits. The characters (code) associated with the meaning fed-in may be gathered from the complementary outputs of these extreme value circuits.

These self-correcting translators have the property of furnishing at the output the correct result despite a certain number of faults in the components. The number of these self-correcting component faults can arbitrarily raise by increasing the redundance of the translator. This, however, requires a considerable expenditure so that the redundance is kept as small as possible. If now some faults in the components occur this does not affect the correct operation. The additively occurring faults, however, may cause an improper operation of the translator. It is therefore desirable to recognize those faults which have already occurred so that these elements can be replaced before the system fails completely.

It is therefore the object of the invention to find a method for indicating the faults of components in self-correcting translators of the prescribed design, so that it is possible to recognize the failures in due time, so that the corresponding elements can be replaced before the translator fails completely. The method according to the invention is characterised in that the extreme value found in each extreme value circuit will be compared with the extreme value existing at the no fault condition and that a deviation from the normal value is evaluated as a criterion for the fault of a component.

According to a further embodiment of the invention the type or kind of faults (e.g. open or short circuit) can be determined so the polarity of the deviation of the extreme values is used. Checking of the extreme value or extreme values can be made during normal operation or in the intervals between normal operations. Further embodiments of the invention are compiled in the claim in conjunction with the figures and the description of the figures.

Figure 2:
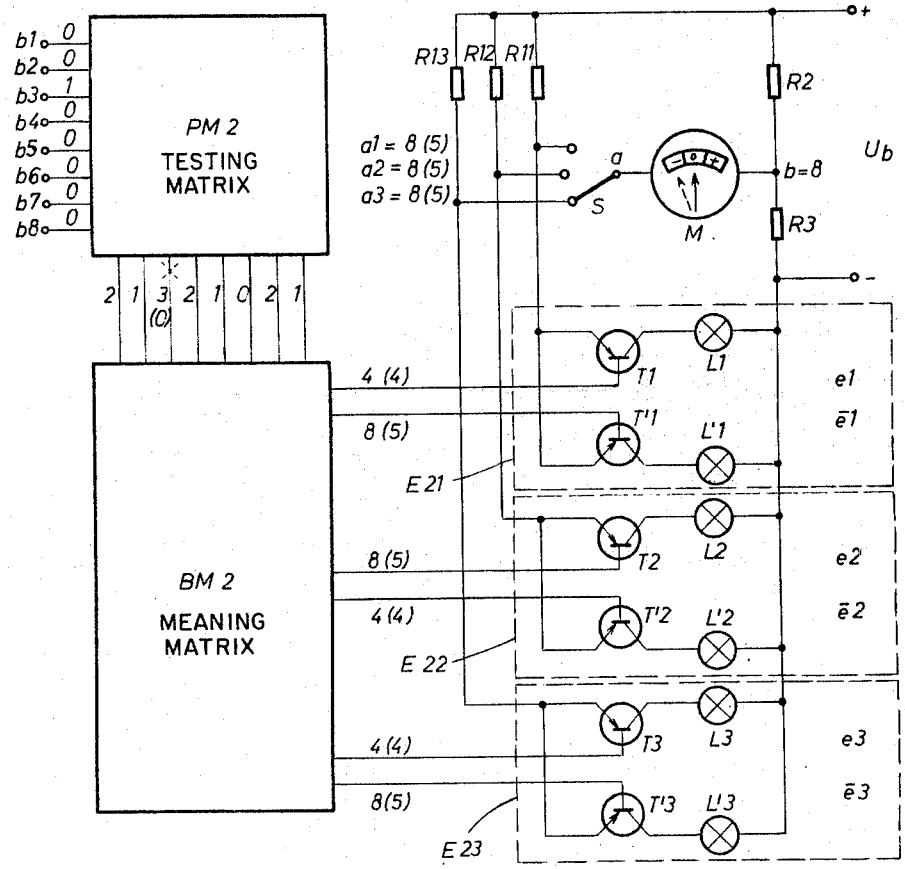
Figure 3:
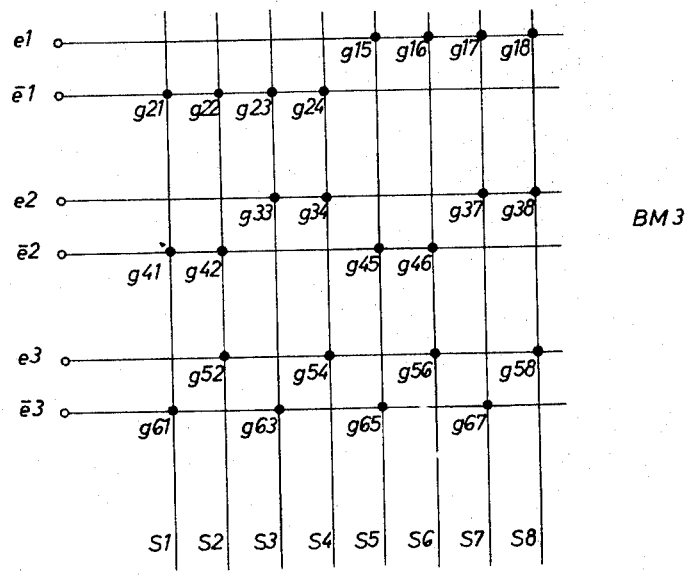
Figure 4:
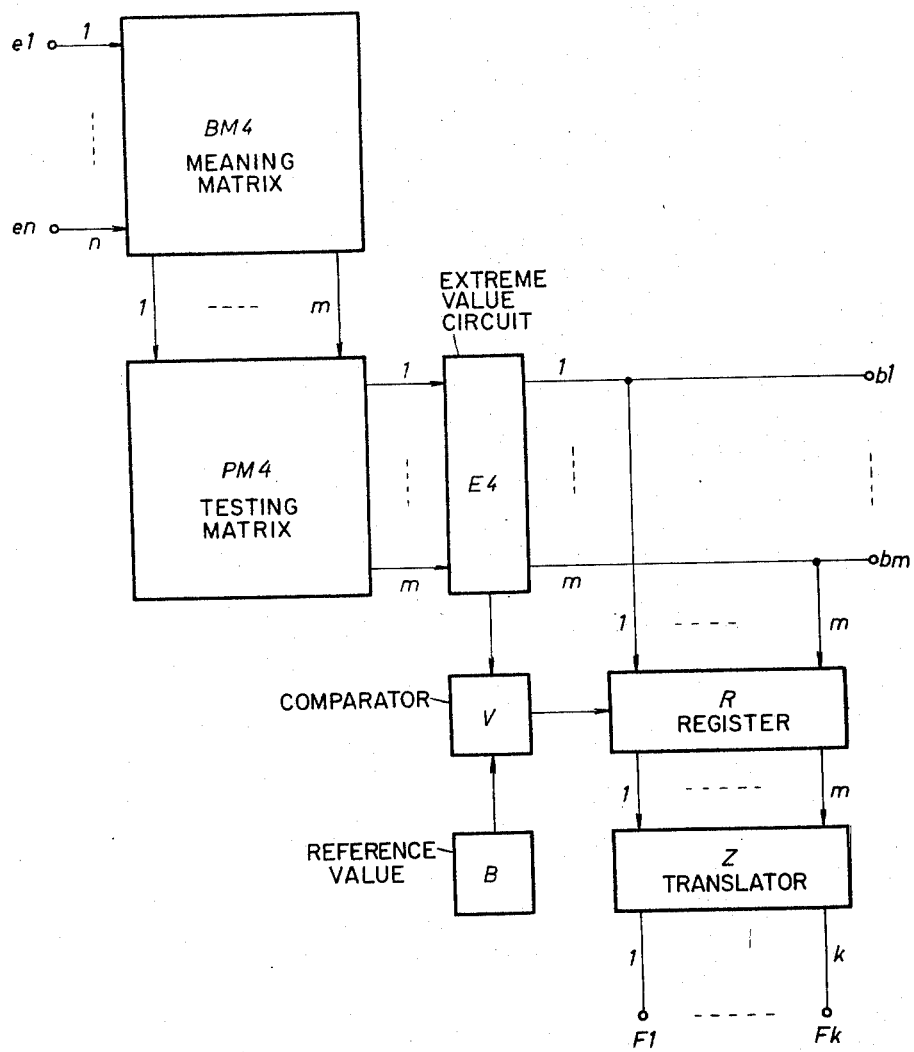

The object of the invention is now in detail explained with the aid of the accompanying drawings wherein:

FIG. 1 shows a decoding circuit with the arrangement according to the invention to indicate the faults of components, FIG. 2 shows a coding circuit with the arrangement according to the invention to indicate faults in components, FIG. 3 shows a meaning matrix in which the individual conductance values are marked, FIG. 4 shows a decoding circuit with automatic indication and spotting of the individual faults of components.

The circuit arrangement according to FIG. 1 contains a self-correcting decoding circuit, known per se, with a meaning matrix BM1, a testing matrix PM1, and an extreme value circuit E1. In addition, the arrangement according to the invention to indicate the faults in components is provided. To simplify the explanation the individual outputs $b1$ to $b8$ are represented by lamps L1 to L8 which are lit when the output is marked.

The meaning matrix BM1 possesses three complementary input pairs $e1$ to $e3$ and eight output lines which are connected with the eight input lines of the testing matrix PM1. The linking points of each output line of the meaning matrix BM1 (columns) are aligned thereby to the code word corresponding to this meaning as is indicated by the figure 0 or 1, respectively at the linking points.

The testing matrix PM1 is designed in the way known in a quadrangular shape (equal number of lines and columns). At the cross points of the testing matrix PM1 different conductance values with the units 1, 2, and 3 are provided. If no conductance value exists it is indicated by a 0. The linkage scheme of the testing matrix PM1 corresponds to the similarity matrix of the input code. The similarity matrix is obtained, if we lay down the binary input code in the mathematical sense as a matrix and multiply it with its transposed one.

This multiplication of the matrix may be gathered from the following table.

TABLE 1

| | | |
|---|---|---|
| 0 1 0 1 0 1 | 0 0 0 0 1 1 1 1 | 3 2 2 1 2 1 1 0 |
| 0 1 0 1 1 0 | 1 1 1 1 0 0 0 0 | 2 3 1 2 1 2 0 1 |
| 0 1 1 0 0 1 | 0 0 1 1 0 0 1 1 | 2 1 3 2 1 0 2 1 |
| 0 1 1 0 1 0 | 1 1 0 0 1 1 0 0 | 1 2 2 3 0 1 1 2 |
| 1 0 0 1 0 1 | 0 1 0 1 0 1 0 1 | 2 1 1 0 3 2 2 1 |
| 1 0 0 1 1 0 | 1 0 1 0 1 0 1 0 | 1 2 0 1 2 3 1 2 |
| 1 0 1 0 0 1 | | 1 0 2 1 2 1 3 2 |
| 1 0 1 0 1 0 | | 0 1 1 2 1 2 2 3 |

The result on the right side is the similarity matrix for the input code. According to the scheme of this the individual conductance values are inserted at the cross points of the testing matrix PM1. If now the combination 010 is applied for example as a code to the input lines $e1$ to $e3$ of the meaning matrix BM1 the following values result at the output lines (columns) of the meaning matrix, viz. 21321021. These excitation values reach the inputs (columns) of the testing matrix PM1 and cause there, corresponding to the linkage values of the testing matrix, at the output line the values indicated at these lines, which values reach the extreme value circuit E1.

The extreme value circuit E1 consists, according to the art known, of as many transistors T1 to T8 as inputs and outputs exist. All emitters of these transistors are interconnected and connected via a common emitter resistor R1 with the positive pole of the operating voltage source $Ub$. The bases of the transistors are the inputs of the extreme value circuit. The collectors of the transistors are connected with the negative pole of the operating voltage source $Ub$ via a lamp L1 to L8. These lamps L1 to L8 must be considered as the decoder outputs $b1$ to $b8$. The excitation values at the outputs (lines) of the testing matrix PM1 are voltage values of negative polarity. This can be obtained by suitable excitation of the input lines of the meaning matrix BM1. The emitter of the individual transistors now rise to the maximum excitation value (extreme value) that is the value 24 (effect of collector stages). The corresponding transistor, here the transistor T3, is conductive and the lamp L3 is lit which means that the output $b3$ is marked. Since the excitation values of the bases of the other transistors are lower than the extreme value those transistors are blocked.

The voltage applied to the emitters (point $a$) is the really existing extreme value. This value is compared with the value applied at the voltage divider point $b$, by the measuring instrument M. The normal value of the extreme value without faults in the components is 24 units. The voltage divider R2–R3, to which the operating voltage $Ub$ is applied, is designed in such a way that at the voltage divider point $b$ a D.C. voltage is produced corresponding to the exciting value 24.

If the excitation value at point $a$ is equal to 24 no voltage difference exists between the two points $a$ and $b$ so that the meter M indicates zero. If in the meaning matrix BM1, however, components fail at any point, e.g. the entire third column, indicated by a cross, this column does not bear the excitation 3 as originally, but the excitation 0 as indicated in brackets. The excitation values at the input of the testing matrix PM1 cause at the output lines (lines) the excitation values shown in brackets. It may be seen that in this example here the maximum value is 15. Despite the failure of an entire column in the meaning matrix the correct output $b3$ is marked by the extreme value circuit E1. Since, however, the maximum value, i.e. the extreme value, is only 15 point $a$ is no more marked with excitation value 24 but only with 15. Between the points $a$ and $b$ a voltage difference exists and the meter M deviates to the negative. This negative deviation means that the excitation at point $a$ is lower than the comparable value at point $b$.

In the example just mentioned an entire column of the meaning matrix BM1 was interrupted. This means that all linking points of this column are interrupted. It is, however, possible that the individual conductance values at the cross points are not interrupted but represent a short circuit. In such a case, marking of the column in which the short circuit exists is essentially higher than the normal value. Therefore, the extreme value determined in the extreme value circuit E1 rises simultaneously and the excitation at point $a$ is higher than the excitation of 24 units at point $b$. Due to this voltage difference the meter M shows a positive deviation, consequently the prevailing operating condition of the translator can be read from the meter M. If the translator is all right the pointer of the meter is on 0, if an interruption occurred in the translator a negative value and in case of a short circuit in the translator a positive value is indicated by the meter M.

Instead of the meter M any other indicating device can be inserted, e.g. a polarized or a normal relay which releases any alarm device. By such a device the translator can be constantly supervised during normal operation. Up to a certain limit the translator corrects the faults in the components itself, but renders an alarm simultaneously so that the faulty elements can be replaced in due time before the entire translator fails.

It is also possible to test the translator completely, after certain periods of operation, whether for all fed-in input signals not only the correct translation but also the normally existing extreme value is obtained.

FIG. 2 shows a self-correcting code circuit with a testing matrix PM2, a meaning matrix BM2 and three extreme value circuits E21, E22, and E23. The testing matrix PM1 (FIG. 1) and the meaning matrix BM2 is exactly designed like the meaning matrix BM1, except for the difference that the inputs and outputs are interchanged. The outputs of the meaning matrix BM2 are complementary and each complementary output pair is connected with two inputs of each extreme value circuit. Since, however, three extreme value circuits exist, three extreme values are obtained which may differ from each other, and, consequently, all three values must be supervised. The points $a1$, $a2$, and $a3$ at the emitters of the corresponding extreme value circuits are connected with a switch-over S by which always one of the three inputs can be connected with the point $a$ of the meter M. The resistors R13, R12, and R11 are the emitter resistors of the three extreme value circuits. The function of this indicating device according to FIG. 2 is in principle the same as the one described in FIG. 1, except for the difference that either three indicating devices M must exist, or that the extreme values to be supervised are switched over by a suitable switch.

With the circuit arrangements described not only the failure of components can be indicated but also their position in the matrices can be distinctly determined. The individual conductance values at the cross points of a meaning matrix BM3 and the individual columns of this matrix are marked as shown in FIG. 3. This meaning matrix BM3 is, e.g. a meaning matrix from a decoding circuit as was described in connection with FIG. 1. The Table 2 shows, in dependence from the three input variables $e1$, $e2$, $e3$, the indication at the meter M in case of interruptions in the individual columns S1 to S8.

TABLE 2.—INTERRUPTION OF A COLUMN

| | Input code (21, 22, 23) | | | | | | | | |
|---|---|---|---|---|---|---|---|---|---|
| 21 | 0 | 0 | 0 | 0 | 1 | 1 | 1 | 1 | Interruption of column |
| 22 | 0 | 0 | 1 | 1 | 0 | 0 | 1 | 1 | |
| 23 | 0 | 1 | 0 | 1 | 0 | 1 | 0 | 1 | |
| Indication at meter M | − | 0 | 0 | 0 | 0 | 0 | 0 | 0 | S₁ |
| | 0 | − | 0 | 0 | 0 | 0 | 0 | 0 | S₂ |
| | 0 | 0 | − | 0 | 0 | 0 | 0 | 0 | S₃ |
| | 0 | 0 | 0 | − | 0 | 0 | 0 | 0 | S₄ |
| | 0 | 0 | 0 | 0 | − | 0 | 0 | 0 | S₅ |
| | 0 | 0 | 0 | 0 | 0 | − | 0 | 0 | S₆ |
| | 0 | 0 | 0 | 0 | 0 | 0 | − | 0 | S₇ |
| | 0 | 0 | 0 | 0 | 0 | 0 | 0 | − | S₈ |

If for example the third column failed the meter M shows a negative value for an input code 010, for all other input codes zero. Depending at which position the indication "minus" is, it can be determined when feeding in all input core characters, which column has been interrupted. The similar case applies for short circuits of the conductance values as may be gathered from the Table 3.

TABLE 3.—SHORT CIRCUIT OF A CONDUCTANCE VALUE

Input code ($e1, e2, e3$)

| $e1$<br>$e2$<br>$e3$ | 0<br>0<br>1 | 0<br>0<br>1 | 0<br>1<br>0 | 0<br>1<br>1 | 1<br>0<br>0 | 1<br>0<br>1 | 1<br>1<br>0 | 1<br>1<br>1 | Short cct. of the conduct. value |
|---|---|---|---|---|---|---|---|---|---|
| Indication at the meter M | 0 | 0 | 0 | 0 | 0 | + | + | + | $g15$ |
| | 0 | 0 | 0 | 0 | + | 0 | + | + | $g16$ |
| | 0 | 0 | 0 | 0 | + | + | 0 | + | $g17$ |
| | 0 | 0 | 0 | 0 | + | + | + | 0 | $g18$ |
| | 0 | + | + | + | 0 | 0 | 0 | 0 | $g21$ |
| | + | 0 | + | + | 0 | 0 | 0 | 0 | $g22$ |
| | + | + | 0 | + | 0 | 0 | 0 | 0 | $g23$ |
| | + | + | + | 0 | 0 | 0 | 0 | 0 | $g24$ |
| | 0 | 0 | 0 | + | 0 | 0 | + | + | $g33$ |
| | 0 | 0 | + | 0 | 0 | 0 | + | + | $g34$ |
| | 0 | 0 | + | + | 0 | 0 | 0 | + | $g37$ |
| | 0 | 0 | + | + | 0 | 0 | + | 0 | $g38$ |
| | 0 | + | 0 | 0 | + | + | 0 | 0 | $g41$ |
| | + | 0 | 0 | 0 | + | + | 0 | 0 | $g42$ |
| | + | + | 0 | 0 | 0 | + | 0 | 0 | $g45$ |
| | + | + | 0 | 0 | + | 0 | 0 | 0 | $g46$ |
| | 0 | 0 | 0 | + | 0 | + | 0 | + | $g52$ |
| | 0 | + | 0 | 0 | 0 | + | 0 | + | $g54$ |
| | 0 | + | 0 | + | 0 | 0 | 0 | + | $g56$ |
| | 0 | + | 0 | + | 0 | + | 0 | 0 | $g58$ |
| | 0 | 0 | + | 0 | + | 0 | + | 0 | $g61$ |
| | + | 0 | 0 | 0 | + | 0 | + | 0 | $g63$ |
| | + | 0 | + | 0 | 0 | 0 | + | 0 | $g65$ |
| | + | 0 | + | 0 | + | 0 | 0 | 0 | $g67$ |

The Table 3 differs from Table 2 in that the indication at the meter M is not only depending from the columns but also from the individual conductance values $g15$ to $g67$. Here too, the individual code words are fed in successively. If the meter M indicates e.g. the values $00++00+0$ due to feeding-in the entire code words as a consequence of indication results it can be determined from Table 3 due to this so-called code that the conductance value $g38$ is short-circuited.

The failure of a component can be spotted therefore by means of a table. However, it is also possible to provide a special translator which is designed on the basis of such a table and in which the signal composed of the individual indication results is fed in so that at the output of this translator it is indicated which component failed.

FIG. 4 shows schematically a self-correcting decoder circuit which consists of the meaning matrix BM4, the testing matrix PM4, and the extreme value circuit E4. During normal operation only these three components or sub-assemblies cooperate in such a way that the code to be decoded is applied to the input lines $e_1$ to $e_n$ and the output signal is gained at the terminals $b_1$ to $b_n$. The extreme value found in the extreme value circuit E4 is compared with a reference value by means of a comparison circuit V, said reference value originating from the source B.

The difference between these two values is led to a register R which contains $m$ register cells. This register R is controlled by the output lines $b_1$ to $b_m$, in order to store the output signals of the comparison circuit V into the corresponding register cells of the register R, in dependence of the different input code words. If the register R is full the individual values are advanced to the following translator Z by means not shown here, whereby this translator can be constructed in compliance with one of the Tables 2 or 3 for example, and at the output lines $F_1$ to $F_k$ it is indicated which element is faulty.

The register R and the translator Z may be constructed in any way known. It is furthermore possible in another self-correcting translator as already described above to supervise the extreme value circuits, which translator serves to convert any arbitrary first code into any arbitrary second code and which may consist for example of the series-connection of a decoder according to FIG. 1 and of a coder according to FIG. 2, so that defects in components in both sub-assembly groups can be determined.

While I have described above the principles of my invention in connection with specific apparatus, it is to be clearly understood that this description is made only by way of example and not as a limitation to the scope of my invention as set forth in the objects thereof and in the accompanying claim.

What is claimed is:
1. A circuit for decoding or coding signals comprising a first matrix wherein the signals to be operated on are connected with the inputs of the first matrix, a second matrix, the outputs of the first matrix being connected with the inputs of the second matrix, an extreme value circuit, the outputs of the second matrix being connected with the inputs of the extreme-value circuit, whereby the output lines of the extreme value circuit serve as decoder or coder outputs, wherein the extreme-value circuit is equipped with a transistor for each input, the bases of said transistors being connected with the input lines, the collectors via output resistors being connected with the first pole of a voltage source, and the emitters with the second pole of the voltage source, and wherein the real extreme value is tapped at at least one transistor emitter and the existing extreme value during normal operation is tapped at a voltage divider connected to the operating voltage, a comparison circuit which compares the real extreme values with the normal extreme values, a register connected with the output of the comparison circuit, and a translator operatively responsive to the output of the register for generating one or more signals indicative of the failure of a matrix component.

References Cited

UNITED STATES PATENTS

| 3,008,129 | 11/1961 | Katz | 340—174 |
| 3,152,320 | 10/1964 | Domenico et al. | 340—147 |
| 3,184,710 | 5/1965 | Martens | 340—146.1 |
| 3,045,209 | 7/1962 | Pomerene | 340—147 |
| 3,135,946 | 6/1964 | Miller et al. | 340—147 |
| 3,100,888 | 8/1963 | Oleksiak | 340—174 |
| 3,157,860 | 11/1964 | Batley | 340—174 |
| 3,047,843 | 7/1962 | Katz et al. | 340—174 |

FOREIGN PATENTS

| 123,658 | 3/1959 | U.S.S.R. |

MALCOLM A. MORRISON, *Primary Examiner.*

MARTIN P. HARTMAN, *Assistant Examiner.*